United States Patent [19]

Shoji et al.

[11] 4,406,000
[45] Sep. 20, 1983

[54] TRACKING SYSTEM FOR OPTICAL RECORD MEDIUM

[75] Inventors: Robert M. Shoji, Gardena; John S. Chudy; Carlyle J. Eberly, both of Long Beach, all of Calif.

[73] Assignee: Discovision Associates, Costa Mesa, Calif.

[21] Appl. No.: 249,549

[22] Filed: Mar. 31, 1981

[51] Int. Cl.³ ............................................. G11B 21/10
[52] U.S. Cl. ...................................... 369/44; 250/202
[58] Field of Search ........................... 369/44, 43, 111; 360/77; 358/128.5, 342; 250/202; 318/577, 596

[56] References Cited

U.S. PATENT DOCUMENTS

| | | | |
|---|---|---|---|
| 3,474,418 | 10/1969 | Jensen | 369/44 |
| 4,037,252 | 7/1977 | Janssen | 369/44 |
| 4,138,663 | 2/1979 | Lehureau | 369/44 |
| 4,268,745 | 5/1981 | Okano | 369/44 |
| 4,271,334 | 6/1981 | Yordy | 369/44 |
| 4,338,682 | 7/1982 | Hosaka | 369/44 |

FOREIGN PATENT DOCUMENTS

| | | | |
|---|---|---|---|
| 55-38686 | 3/1980 | Japan | 369/44 |
| 2029051 | 3/1980 | United Kingdom | 369/44 |

OTHER PUBLICATIONS

Patent Abstracts of Japan, vol. 1, No. 37, 3/13/78, p. 102E78.
Patent Abstracts of Japan, vol. 2, No. 129, 10/27/78, p. 7876E78.

*Primary Examiner*—Alan Faber

[57] ABSTRACT

Tracking apparatus and related method for use in a playback system for recovering information from a selected recording track on an optical record medium such as a video disc. The tracking apparatus produces a tracking error signal representative of the deviation of a scanning reading beam from the centerline of the selected track, and couples this error signal to a movable tracking mirror to form a servo for controllably positioning the beam in alignment with the track. The tracking apparatus further includes a defect detection circuit for monitoring the tracking error signal and producing a pair of control signals that indicate when video disc defects of prescribed types are being scanned, and a threshold detector circuit for comparing the error signal to prescribed positive and negative thresholds that are selectively-variable in accordance with the pair of control signals. A tracking loop disable signal is produced whenever the magnitude of the error signal exceeds either threshold, and this disable signal is used to uncouple the tracking error signal from the tracking mirror, so that the reading beam is maintained at its current position until the dimple has been passed.

17 Claims, 8 Drawing Figures

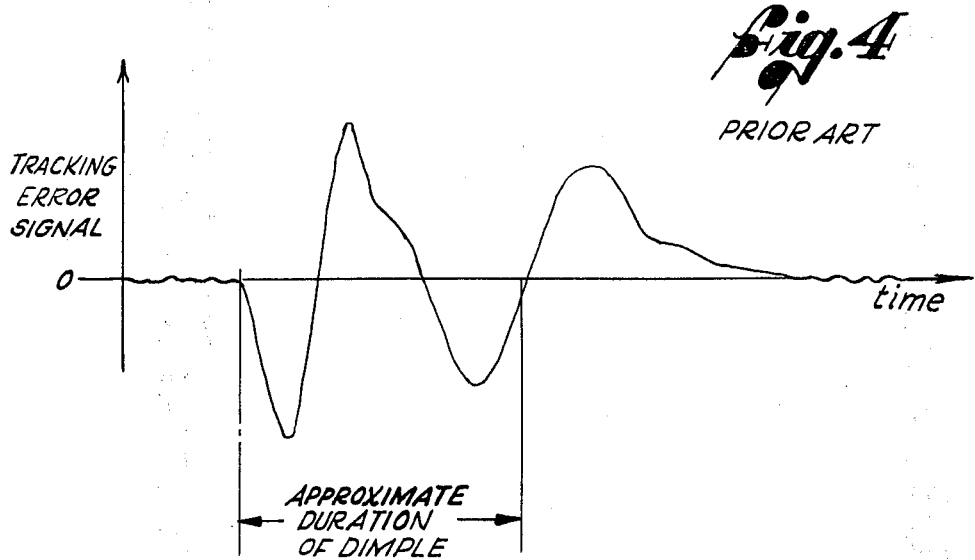
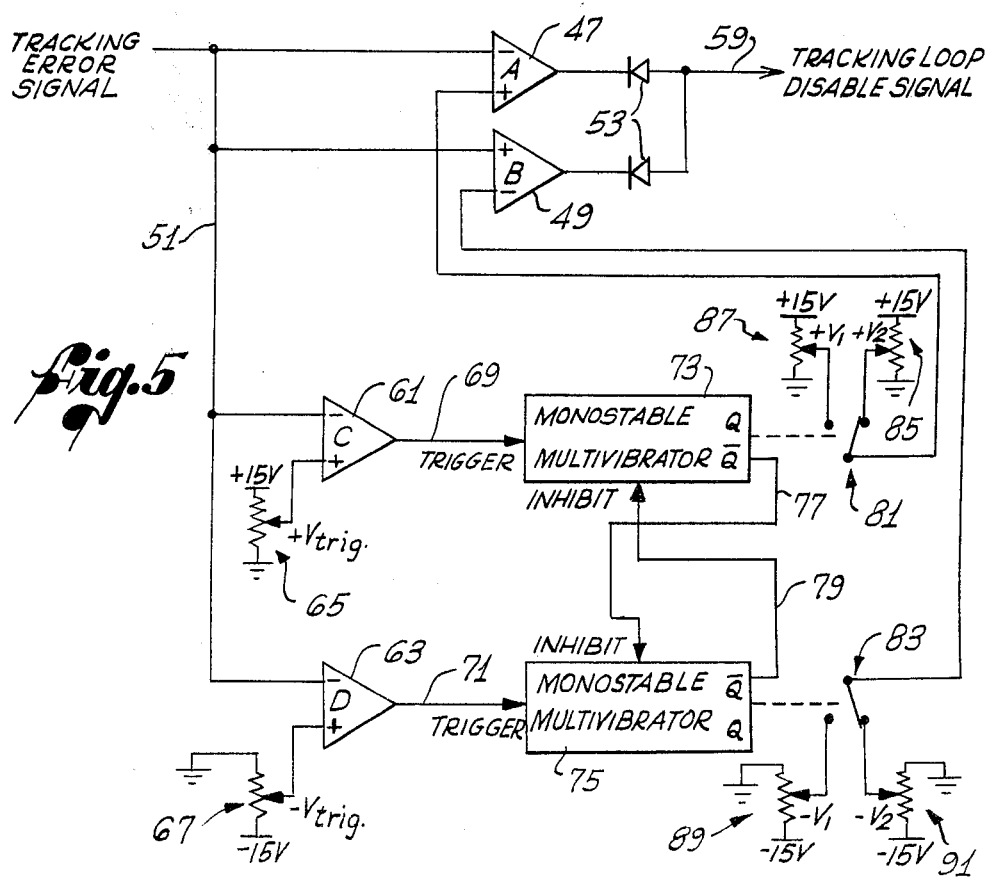

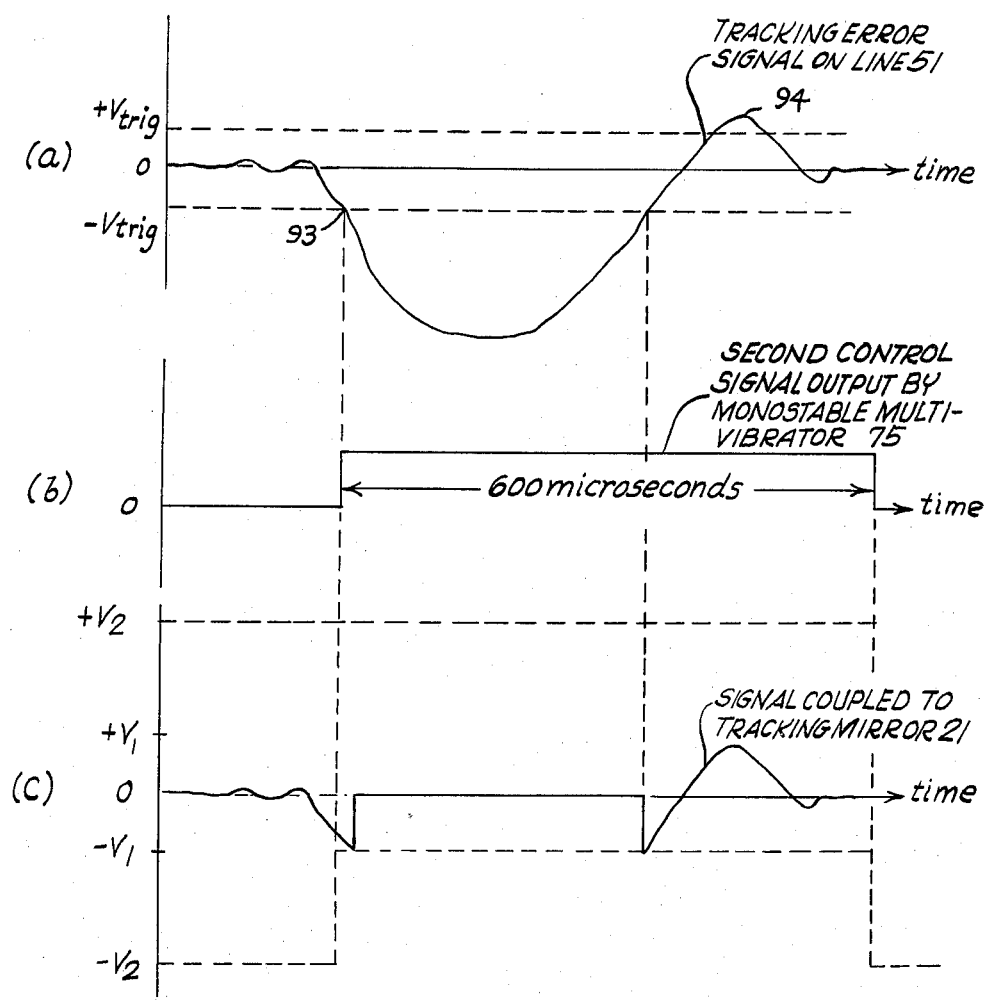

TRACKING SYSTEM FOR OPTICAL RECORD MEDIUM

This invention relates generally to tracking apparatus and related methods for use in recovering information from a record medium, and, more particularly, to tracking apparatus of a type that align a beam of light relative to a selected one of a plurality of parallel recording tracks on a record medium.

Tracking apparatus of this particular type are of special use in video disc playback machines. An example of such a machine and of one typical prior tracking apparatus is disclosed in U.S. Pat. No. 4,332,022, issued May 25, 1982, entitled "Tracking System For Player", filed Mar. 17, 1980 in the names of Ludwig Ceshkovsky et al and assigned to the assignee of the present application. The disclosed apparatus directs a reading beam of light via a radially-movable tracking mirror onto a selected one of a plurality of substantially circular and concentric recording tracks on the disc. The beam is reflected in accordance with the recorded information, and the intensity of this reflected beam is detected and suitably processed, to produce a tracking error signal representative of the deviation of the reading beam from the centerline of the selected track. This error signal is coupled back to the tracking mirror, to form a servo for controllably positioning the point of impingement of the beam on the disc in alignment with the centerline of the selected track.

Alternative tracking apparatus are disclosed in U.S. Pat. No. 4,232,201 to L. S. Canino, entitled "Dithered Center Tracking System", and U.S. Pat. No. 4,232,337 to J. S. Winslow et al, entitled "Method and Apparatus for Tracking an Optically Readable Information Track". In both of the disclosed apparatus, a reading beam of light is controllably positioned relative to a selected track on a video disc by a tracking error signal that varies in accordance with the position of the beam relative to the track centerline.

Although the tracking systems described above have proven generally satisfactory in maintaining a reading beam aligned with a selected track on a video disc, they have not been entirely effective when the disc includes defects such as dimples in its information-bearing surface. Dimples are believed to be caused by minute particles being lodged beneath a thin, metallic stamper used in molding the video discs, and they generally cause large groups of adjacent recording tracks to deviate momentarily from their normal radial locations.

Prior tracking apparatus have normally attempted to maintain the reading beam continuously aligned with a selected track, even when scanning in the vicinity of a dimple. However, because of the particular magnitude and duration of the track deviations caused by each dimple, this attempt at continuous alignment sometimes has caused the beam to overshoot the selected track and inadvertently jump to an adjacent track. When the reading beam is scanning a track on the approaching side of a dimple, this track-jumping phenomenon causes the beam to jump back repeatedly to the previously-scanned track. On the other hand, if the reading beam has passed through the center of a dimple and is scanning a track on its far side, this track-jumping phenomenon causes the reading beam to jump to the next succeeding track so that information stored on at least one track is not recovered.

It should be apparent from the foregoing that there is a definite need for a tracking system that includes means for compensating for the presence of dimples and other defects in the recording media that otherwise can cause a loss of tracking. The present invention fulfills this need.

SUMMARY OF THE INVENTION

The present invention is embodied in a tracking apparatus and related method for aligning a reading beam in a prescribed position relative to a selected recording track on a record medium. The apparatus includes beam steering means for controllably directing the reading beam onto the record medium, along with means for detecting any deviation of the beam from the selected track and for producing a corresponding tracking error signal. This error signal is coupled back to the beam steering means, to form a servo for aligning the beam in the prescribed position.

The tracking apparatus further includes defect compensation means and associated switch means, for compensating for defects in the record medium of a type that might otherwise cause the reading beam to jump inadvertently to an adjacent track. The defect compensation means monitors the tracking error signal to determine when the beam has encountered such a defect, and produces a corresponding disable signal for coupling to the switch means, to selectively uncouple the error signal from the beam steering means. The reading beam is therefore maintained at its current position until the defect has been passed.

In accordance with the invention, the defect compensation means includes means for monitoring the tracking error signal, to detect when the reading beam scans a prescribed type of defect, and for producing a corresponding control signal, along with threshold detector means for comparing the tracking error signal to a prescribed threshold that is selectively variable in accordance with the control signal. The threshold detector means produces the disable signal whenever the error signal exceeds the threshold.

More particularly, the tracking apparatus of the invention has particular utility in a playback machine for use in recovering information from a video disc. A reading beam of light is directed onto the disc by a radially-movably tracking mirror, to produce a reflected beam having an intensity modulated by the recorded information. The intensity of the reflected beam is monitored and processed in a conventional fashion to produce the tracking error signal, which is coupled back to the tracking mirror, to maintain the reading beam in alignment with the centerline of the selected track. The apparatus is particularly adapted to detect and respond to video disc defects in the form of dimples, which are believed to be generally conically-shaped irregularities in the recording surface of the disc, each extending across as many as several hundred adjacent recording tracks.

In the preferred embodiment, the monitoring means of the defect compensation means compares the error signal to both a prescribed positive threshold and a prescribed negative threshold. When the reading beam encounters a dimple while scanning a track on the far side of the dimple's center, the positive threshold is normally exceeded first, and a first control signal is produced. Conversely, when the reading beam encounters a dimple while scanning a track on the approaching side of the dimple's center, the negative threshold is normally exceeded first, and a second control signal is produced. The two control signals are produced by monostable multivibrator circuits and have prescribed, fixed durations that are at least as long as the normal duration of the dimple being scanned.

The threshold detector means of the defect compensation means compares the tracking error signal to a prescribed pair of positive and negative thresholds that are fixed in accordance with the first and second control signals, When the first control signal is present, the magnitude of the negative threshold in the pair is greater than that of the positive threshold. Conversely, when the second control signal is present, the magnitude of the positive threshold is greater than that of the negative threshold. This selectively-variable threshold feature helps ensure that the tracking apparatus does not permit the reading beam to overshoot the selected track and jump inadvertently to an adjacent track.

The tracking loop disable signal is produced whenever the tracking error signal exceeds either threshold of the threshold detector means. This disable signal is coupled to the switch means, to uncouple the error signal from the tracking mirror. While the error signal is uncoupled from the tracking mirror, the reading beam remains at its current radial location on the disc and is not urged to follow the deviating path of the selected track. After the dimple has been passed, the error signal will no longer exceed either threshold, and the error signal is recoupled through the switch means to the tracking mirror.

Other aspects and advantages of the present invention should become apparent from the following description of the preferred embodiment, taken in conjunction with the accompanying drawings, which disclose, by way of example, the principles of the invention.

BRIEF DESCRIPTION OF THE DRAWINGS

FIG. 4 is a graph of a tracking error signal produced by tracking apparatus of the prior art when the reading beam encounters a typical dimple;

FIG. 5 is a schematic circuit diagram of the dimple compensation circuit of FIG. 1; and FIG. 6, consisting of a-c, is a set of graphs showing several signals produced by the tracking apparatus of FIG. 1.

DESCRIPTION OF THE PREFERRED EMBODIMENT

Figure 1:
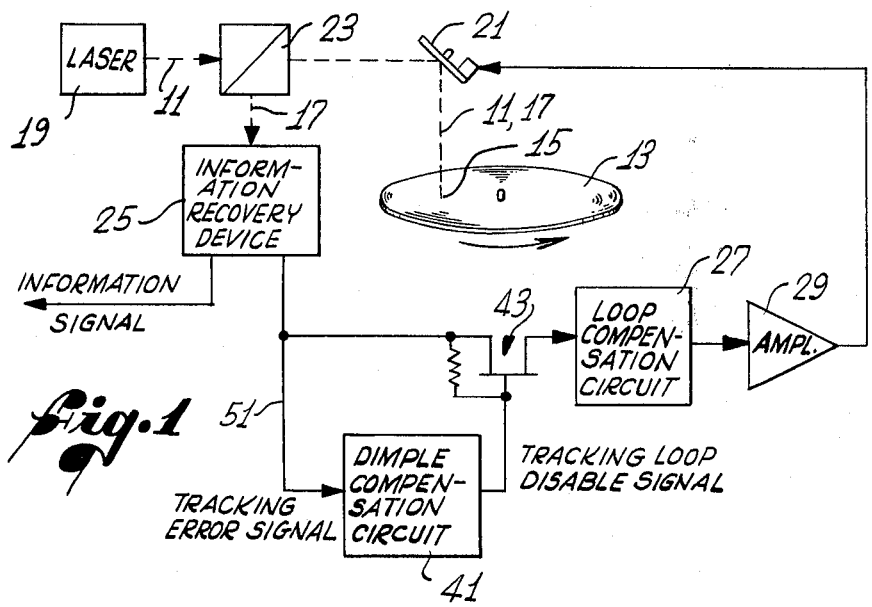
FIG. 1 is a simplified block diagram of tracking apparatus in accordance with the present invention, for maintaining a reading beam of light aligned with a selected track on a video disc.

Referring now to the drawings, and particularly to FIG. 1, there is shown a tracking apparatus for use in a video disc playback machine, for maintaining a reading beam of light 11 aligned with a selected recording track on a video disc 13. The disc includes a plurality of closely-spaced recording tracks arranged in a spiral or concentric circle pattern. The reading beam is focused to a spot 15 aligned with a selected one of these tracks, as the disc is rotated in a prescribed fashion, to produce a reflected beam 17 that is modulated in intensity in accordance with the recorded information.

The apparatus includes a laser 19 for producing the incident reading beam 11, a radial tracking mirror 21 for controllably positioning the reading beam spot 15 at a prescribed radial location on the disc 13, and a beam splitter 23 for separating the reflected beam 17 from the incident beam. The apparatus further includes an information recovery device 25 for monitoring the intensity of the reflected beam and producing both an information signal, corresponding to the modulated intensity of the reflected beam, and a tracking error signal, indicative of the deviation of the reading beam spot 15 from the centerline of the selected recording track. This tracking error signal is coupled back to the radial tracking mirror 21 via a loop compensation circuit 27 and an amplifier 29, to form a servo for controllably positioning the reading beam spot in alignment with the selected track.

Figure 2:
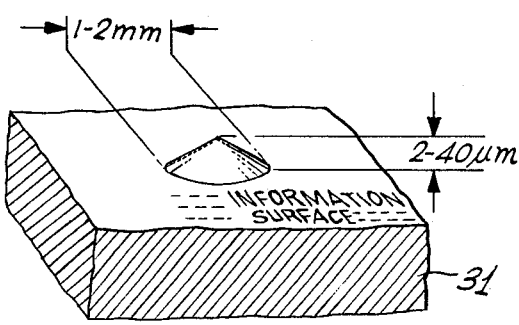
FIG. 2 is a fragmentary perspective view of a portion of a stamper used in molding the video disc of FIG. 1, showing in exaggerated form a dimple in the information-bearing surface of the stamper.

Tracking difficulties arise when the video disc 13 includes defects such as dimples in its information-bearing surface, which cause nearby recording tracks to deviate momentarily from their normal, substantially circular, shape. A typical dimple is generally conically-shaped, with a height of about 2 to 40 microns and a diameter of about 1 to 2 millimeters, extending over several hundred recording tracks. Dimples are believed to be created by the presence of foreign particles beneath a thin, metallic stamper used in molding the video disc. A perspective view of a stamper fragment 31 having such a dimple is shown in FIG. 2.

Figure 3:
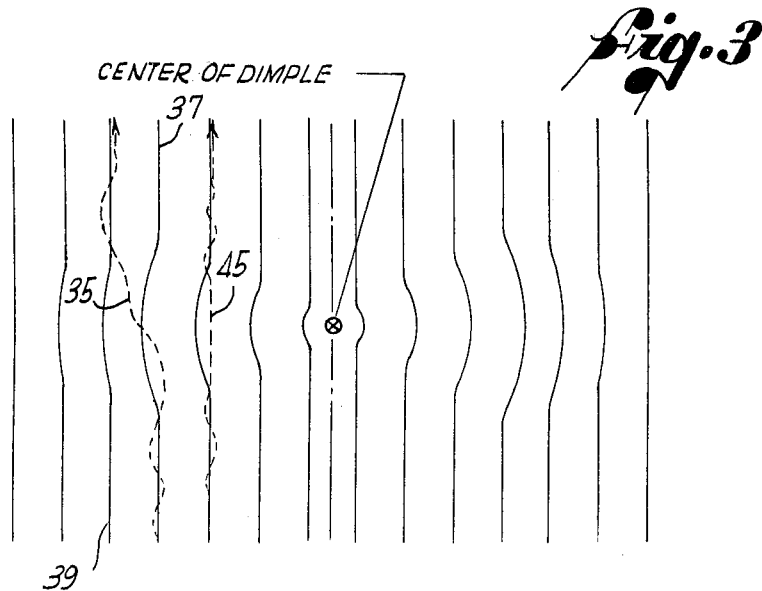
FIG. 3 is a plan view of the portion of a video disc produced by the stamper of FIG. 2, showing in exaggerated form the deviations in the directions of the recording tracks adjacent to the dimple.

The effect a dimple has on the shape of the nearby recording tracks of the video disc 13 is depicted, in exaggerated form, in FIG. 3. It will be observed that on both sides of the dimple, the tracks deviate away from the dimple center.

FIG. 3 also shows, in diagrammatic form at 35, the path of the reading beam spot 15 when typical tracking apparatus of the prior art is used. Such prior apparatus typically attempts to maintain the spot continuously aligned with a recording track 37 that is deviating momentarily to the left because of a dimple. Because of the relatively slow response time of the apparatus, however, the spot reaches the deviating track only after the track is moving back to its original alignment. As a result, the spot overshoots the track 37 and becomes aligned with an adjacent track 39.

FIG. 4 depicts a typical tracking error signal that is produced by prior tracking apparatus when a dimple is encountered and the reading beam spot 15 jumps inadvertently to the adjacent track 39. It will be observed that the signal oscillates between relatively large positive and negative values as the spot first strays from the selected track 37 and then overshoots the track to become aligned with the adjacent track.

When scanning tracks on the approaching side of the dimple center, this track-jumping phenomenon will result in the reading beam hanging up on a single pair of tracks and the repeated recovery of the same information from the disc 13. When video information is being recovered, a stop-motion display will result. On the other hand, if by chance the reading beam spot has passed through the dimple center and is scanning a track on its far side, this phenomenon will result in the skipping of some of the tracks. In this case, a fast motion display of the recovered video information will result.

The track-skipping phenomenom described above is eliminated by the inclusion of a dimple compensation circuit 41 and an associated FET switch 43 in the apparatus of FIG. 1. The dimple compensation circuit monitors the tracking error signal, to determine when a dimple of prescribed magnitude is being scanned, and produces a corresponding tracking loop disable signal to disable the FET switch and thereby uncouple the tracking error signal from the radial tracking mirror 21. Thus, when a dimple of the prescribed magnitude is encountered, the relative radial location of the reading beam spot 15 remains fixed. This is shown diagramatically at 45 in FIG. 3. After the dimple has been passed, the error signal is once again coupled through the FET switch to the tracking mirror, and the apparatus again functions as a servo to position the reading beam spot in alignment with the selected track.

A schematic circuit diagram of the preferred dimple compensation circuit 41 is shown in FIG. 5. It includes a threshold detector A 47 and a threshold detector B 49 for comparing the tracking error signal received on line 51 from the information recovery device 25 (FIG. 1) to prescribed, selectively-variable, positive and negative thresholds. The output signals of the two threshold detectors are OR'ed together by a pair of diodes 53, to form the tracking loop disable signal for coupling on line 59 to the gate terminal of the FET switch 43.

In accordance with the invention, the magnitudes of the two selectively-variable thresholds are selected according to whether the reading beam 11 is scanning a track on the approaching side or far side of a dimple. If the dimple compensation circuit 41 determines that the beam is scanning a dimple's approaching side, the positive threshold is selected to have a relatively high magnitude, $+V_2$, and the negative threshold is selected to have a relatively low magnitude, $-V_1$. Conversely, if the beam is determined to be scanning a dimple's far side, the positive threshold is selected to have a relatively low magnitude, $+V_1$, and the negative threshold is selected to have a relatively high magnitude, $-V_2$.

More particularly, the dimple compensation circuit 41 further includes a threshold detector C 61 and a threshold detector D 63, for comparing the tracking error signal to fixed, positive and negative trigger thresholds, respectively. These positive and negative trigger thresholds are selected by potentiometers 65 and 67, respectively, and are normally exceeded by the error signal only when the scanning reading beam 11 has encountered a dimple in the video disc 13. When scanning a track on the approaching side of a dimple, the negative threshold is normally exceeded first, and, conversely, when scanning a track on the far side of a dimple, the positive threshold is normally exceeded first. The threshold detector C outputs a first trigger signal on line 69 when the positive threshold is exceeded, and the threshold detector D outputs a second trigger signal on line 71 when the negative threshold is exceeded.

The dimple compensation circuit 41 of FIG. 5 further includes first and second monostable multivibrators 73 and 75, respectively. The first multivibrator produces a first control signal when triggered by the first trigger signal, and similarly, the second multivibrator produces a second control signal when triggered by the second trigger signal. The first and second control signals both have limited durations of about 600 microseconds, which corresponds to the nominal duration of a typical dimple's effect on the tracking error signal.

The first and second monostable multivibrators 73 and 75 are interconnected with each other to ensure that only one of the first and second control signals is produced at a time. More particularly, the first multivibrator outputs a signal for coupling on line 77 to the second multivibrator, to inhibit the output of a second control signal whenever a first control signal is being produced. Similarly, the second multivibrator outputs a signal for coupling on line 79 to the first multivibrator, to inhibit the output of a first control signal when the second control signal is being produced. As a result, the second control signal indicates that a dimple has been encountered while scanning a track on the approaching side of a dimple, and the first control signal indicates that a dimple has been encountered while scanning a track on the far side of a dimple.

The dimple compensation circuit 41 further includes first and second switches 81 and 83, respectively, for selecting the appropriate positive and negative thresholds for coupling to the threshold detectors A 47 and B 49, respectively. Specifically, the first switch is responsive to the first control signal, and selects between the positive thresholds $+V_1$ and $+V_2$. Similarly, the second switch is responsive to the second control signal and selects between negative thresholds $-V_1$ and $-V_2$. The thresholds $+V_2$, $+V_1$, $-V_1$, and $-V_2$ are controllably selected by potentiometers 85, 87, 89, and 91, respectively.

Thus, when the reading beam 11 scans the approaching side of a dimple, the threshold detectors A 47 and B 49 compare the tracking error signal to the thresholds $+V_2$ and $-V_1$, respectively. If either threshold is exceeded, a tracking loop disable signal is coupled on line 59 to the FET switch 43, to uncouple the error signal from the radially-movable tracking mirror 21. The reading beam then continues to scan the disc 13 at its current radial location, and it is not urged to follow the deviating path of the selected track.

With reference now to FIG. 6a, there is shown a typical tracking error signal produced while scanning the approaching side of a dimple. It will be observed that the error signal has a significant negative excursion as the selected track deviates away from the scanning reading beam 11. The error signal first exceeds the negative trigger threshold at a location indicated by a reference numeral 93. When this occurs, the second monostable multivibrator 75 outputs the second control signal (FIG. 6b), which has a duration of about 600 microseconds. During this 600 microsecond interval, the first switch remains in the show position and 81 couples the threshold $+V_2$ to the threshold detector A 47, and the second switch 83 (in response to the second control signal) couples the threshold $-V_1$ to the threshold detector B 49.

FIG. 6c shows the signal actually coupled to the tracking mirror 21 when the tracking error signal has the waveform shown in FIG. 6a. It will be observed that the two signals are identical except where the error signal exceeds either the $+V_2$ or $-V_1$ threshold, in which case the signal coupled to the mirror has a level of zero. The threshold $+V_2$ has a relatively large magnitude, so that when the dimple has been passed, any overshoot of the reading beam with respect to the selected track will not cause it to jump inadvertently to the adjacent track. This overshoot is indicated by a positive swing 94 in the tracking error signal (FIG. 6a).

In similar fashion, when the reading beam 11 scans the far side of a dimple, the threshold detectors A 47 and B 49 compare the tracking error signal to the thresholds $+V_1$ and $-V_2$, respectively. If either threshold is exceeded, a tracking loop disable signal is coupled on line 59 to the FET switch 43, to uncouple the error signal from the tracking mirror 21. In this case, the threshold $-V_2$ has a relatively large magnitude, so that when the dimple has been passed, any overshoot of the reading beam with respect to the selected track will not cause the beam to jump inadvertently to the adjacent track.

It should be appreciated from the foregoing description that the present invention provides an improved tracking servo apparatus that aligns a scanning reading beam with a selected track on a record medium. The apparatus compensates for the presence of particular defects in the record medium, by comparing a tracking error signal to a pair of prescribed thresholds that are selectively variable according to the type of defect encountered. Whenever either threshold is exceeded, the tracking servo is disabled in a prescribed fashion, to ensure that the reading beam does not jump inadvertently to an adjacent track.

Although the invention has been described in detail with reference to its presently-preferred embodiment, it should be understood by one of ordinary skill in the art that various modifications can be made, without departing from the spirit and scope of the invention. Accordingly, it is not intended that the invention be limited, except as by the appended claims.

We claim:

1. An improvement in a tracking apparatus for aligning a scanning reading beam in a prescribed position relative to a selected recording track on a record medium, and of the type comprising:

means for determining the location of the reading beam relative to the selected track on the record medium, and for producing a corresponding tracking error signal;

beam steering means, responsive to the tracking error signal, for controllably positioning the reading beam in the prescribed position relative to the selected track;

threshold detector means for comparing the tracking error signal to a prescribed pair of thresholds and for producing a disable signal whenever either threshold is exceeded, the disable signal indicating that a record medium defect of a prescribed type is being scanned; and means, responsive to the disable signal, for selectively uncoupling the tracking error signal from the beam steering means, whereby the reading beam is maintained in its current position relative to the record medium whenever the reading beam scans a record medium defect of the prescribed type;

said improvement comprising:

first means for monitoring the tracking error signal to detect when the reading beam scans a first type of defect in the record medium, and for producing a corresponding first control signal;

second means for monitoring the tracking error signal to detect when the reading beam scans a second type of defect in the record medium, and for producing a corresponding second control signal; and means for selecting the pair of thresholds from two possible pairs of thresholds based on whether the first control signal is present or the second control signal is present.

2. The improvement as defined in claim 1, wherein:

the first monitoring means includes means for comparing the tracking error signal to a first, prescribed trigger threshold, to produce a first trigger signal whenever the threshold is exceeded, the first trigger threshold having a prescribed polarity; and the second monitoring means includes means for comparing the tracking error signal to a second, prescribed trigger threshold, to produce a second trigger signal whenever the threshold is exceeded, the second trigger threshold having a polarity opposite that of the first trigger threshold.

3. The improvement as defined in claim 2, wherein:

the first monitoring means further includes first monostable multivibrator means for producing the first control signal, the first multivibrator means being triggered by the first trigger signal;

the second monitoring means further includes second monostable multivibrator means for producing the second control signal, the second multivibrator means being triggered by the second trigger signal; and the first and second control signals both have a prescribed, constant duration.

4. The improvement as defined in claim 3, wherein the durations of the first and second control signals are at least as long as the normal duration of the record medium defects of the prescribed type.

5. The improvement as defined in claim 1, wherein:

the pair of thresholds present in the threshold detector means are opposite in polarity;

the magnitude of the second threshold in the pair is greater than the magnitude of the first threshold in the pair when the first control signal is present; and the magnitude of the first threshold in the pair is greater than the magnitude of the second threshold in the pair when the second control signal is present.

6. The improvement as defined in claim 1, wherein:

the first monitoring means includes means for inhibiting output of the first control signal when the second control signal is present; and the second monitoring means includes means for inhibiting output of the second control signal when the first control signal is present;

whereby only one of the first and second control signals can be present at a time.

7. An improvement in a tracking apparatus for aligning a scanning reading beam in a prescribed position relative to a selected recording track on a record medium, and of the type comprising:

means for determining the location of the reading beam relative to the selected track on the record medium, and for producing a corresponding tracking error signal;

beam steering means, responsive to the tracking error signal, for controllably positioning the reading beam in the prescribed position relative to the selected track;

threshold detector means for comparing the tracking error signal to a prescribed threshold, a disable signal being produced whenever the error signal exceeds the threshold; and means, responsive to the disable signal, for selectively uncoupling the tracking error signal from the beam steering means, whereby the reading beam is maintained in its current position relative to the record medium whenever the reading beam scans a record medium defect of a prescribed type;

said improvement comprising:

means for monitoring the tracking error signal and determining when the reading beam is scanning a defect in the record medium, and for producing a corresponding control signal indicative of the type of defect being scanned;

means for selectively varying the threshold in accordance with the control signal produced by said monitoring means.

8. The improvement as defined in claim 7, wherein the monitoring means includes second threshold detector means for comparing the tracking error signal to a second prescribed threshold, the control signal being produced whenever the error signal exceeds the second threshold.

9. The improvement as defined in claim 8, wherein the control signal has a prescribed duration.

10. The improvement as defined in claim 9, wherein the duration of the control signal is at least as long as the duration of the defect being scanned by the reading beam.

11. An improvement in a tracking apparatus for positioning a reading beam in alignment with a selected track of a plurality of substantially circular and concentric recording tracks on a rotatable video disc, and of the type comprising:

means for determining the location of the reading beam relative to the centerline of the selected track on the video disc, and for producing a corresponding tracking error signal;

beam steering means for controllably positioning the reading beam in accordance with the tracking error signal, whereby the reading beam is positioned in alignment with the selected track;

first threshold detector means for comparing the tracking error signal to prescribed positive and negative thresholds, a disable signal being produced whenever either threshold is exceeded, the disable signal indicating that the reading beam is impinging on a video disc defect of a prescribed type, and switch means, responsive to the disable signal, for selectively uncoupling the tracking error signal from the beam steering means, whereby the reading beam is maintained substantially in its current position whenever it impinges on a video disc defect of the prescribed type;

said improvement comprising:

second threshold detector means for comparing the tracking error signal to prescribed positive and negative trigger signal whenever the magnitude of the error signal exceeds the positive trigger threshold and a second trigger signal whenever the magnitude of the error signal exceeds the negative trigger threshold, wherein the magnitude of the error signal normally exceeds the positive trigger threshold first if a video disc defect causes the selected track to deviate in a first radial direction in a prescribed fashion, and wherein the magnitude of the error signal normally exceeds the negative trigger threshold first if a video disc defect causes the selected track to deviate in a second radial direction in a prescribed fashion;

monostable multivibrator means for producing a first control signal whenever triggered by the first trigger signal, and for producing a second control signal whenever triggered by the second trigger signal, the first and second control signals having prescribed, constant durations; and means for selecting the prescribed positive and negative thresholds from two possible respective threshold pairs based on whether the first control signal is present or the second control signal is present, whereby the positive and negative thresholds of the second threshold detector means have relatively low and high magnitudes, respectively, when the first control signal is present, and relatively high and low magnitudes, respectively, when the second control signal is present.

12. A method for aligning a scanning reading beam in a prescribed position relative to a selected recording track on a record medium, of the type comprising steps of:

determining the location of the reading beam relative to the selected track on the record medium, and producing a corresponding tracking error signal;

controllably positioning the reading beam in the prescribed position related to the selected track in accordance with the tracking errors signal;

monitoring the tracking error signal to detect when the reading beam scans a first type of detect in the record beam, and producing a corresponding first control signal;

monitoring the tracking error signal to detect when the reading beam scans a second type of defect in the record medium, and producing a corresponding second control signal;

comparing the tracking error signal to a prescribed pair of thresholds that are selected from two possible pairs of thresholds based on whether the first or second control signal is present; and producing a disable signal whenever either threshold is exceeded, the disable signal indicating that a record medium defect of a prescribed type is being scanned; and selectively interrupting the step of controllably positioning, in accordance with the disable signal, whereby the reading beam is maintained in its current position relative to the record medium whenever the reading beam scans a record medium defect of the prescribed type.

13. A method as defined in claim 12, wherein:

the first step of monitoring includes a step of comparing the tracking error signal to a first, prescribed trigger threshold, to produce a first trigger signal whenever the threshold is exceeded, the first trigger threshold having a prescribed polarity; and the second step of monitoring includes a step of comparing the tracking error signal to a second, prescribed trigger threshold, to produce a second trigger signal whenever the threshold is exceeded, the second trigger threshold having a polarity opposite that of the first trigger threshold.

14. A method as defined in claim 13, wherein:

the first step of monitoring further includes a step of producing the first control signal in response to the first trigger signal;

the second step of monitoring further includes a step of producing the second control signal in response to the second trigger signal; and the first and second control signals both have a prescribed, constant duration.

15. A method as defined in claim 14, wherein the durations of the first and second control signals are at least as long as the normal duration of the record medium defects of the prescribed type.

16. A method as defined in claim 12, wherein:
the pair of thresholds used in the step of comparing are opposite in polarity;
the magnitude of the second threshold in the pair is greater than the magnitude of the first threshold in the pair when the first control signal is present; and
the magnitude of the first threshold in the pair is greater than the magnitude of the second threshold in the pair when the second control signal is present.

17. A method as defined in claim 12, wherein:
the first step of monitoring includes a step of inhibiting output of the first control signal when the second control signal is present; and
the second step of monitoring includes a step of inhibiting output of the second control signal when the first control signal is present;
whereby only one of the first and second control signals can be present at a time.

* * * * *